Feb. 28, 1950
G. G. HYATT
2,498,811
HARD BOILED EGG SHELLER
Filed July 25, 1947
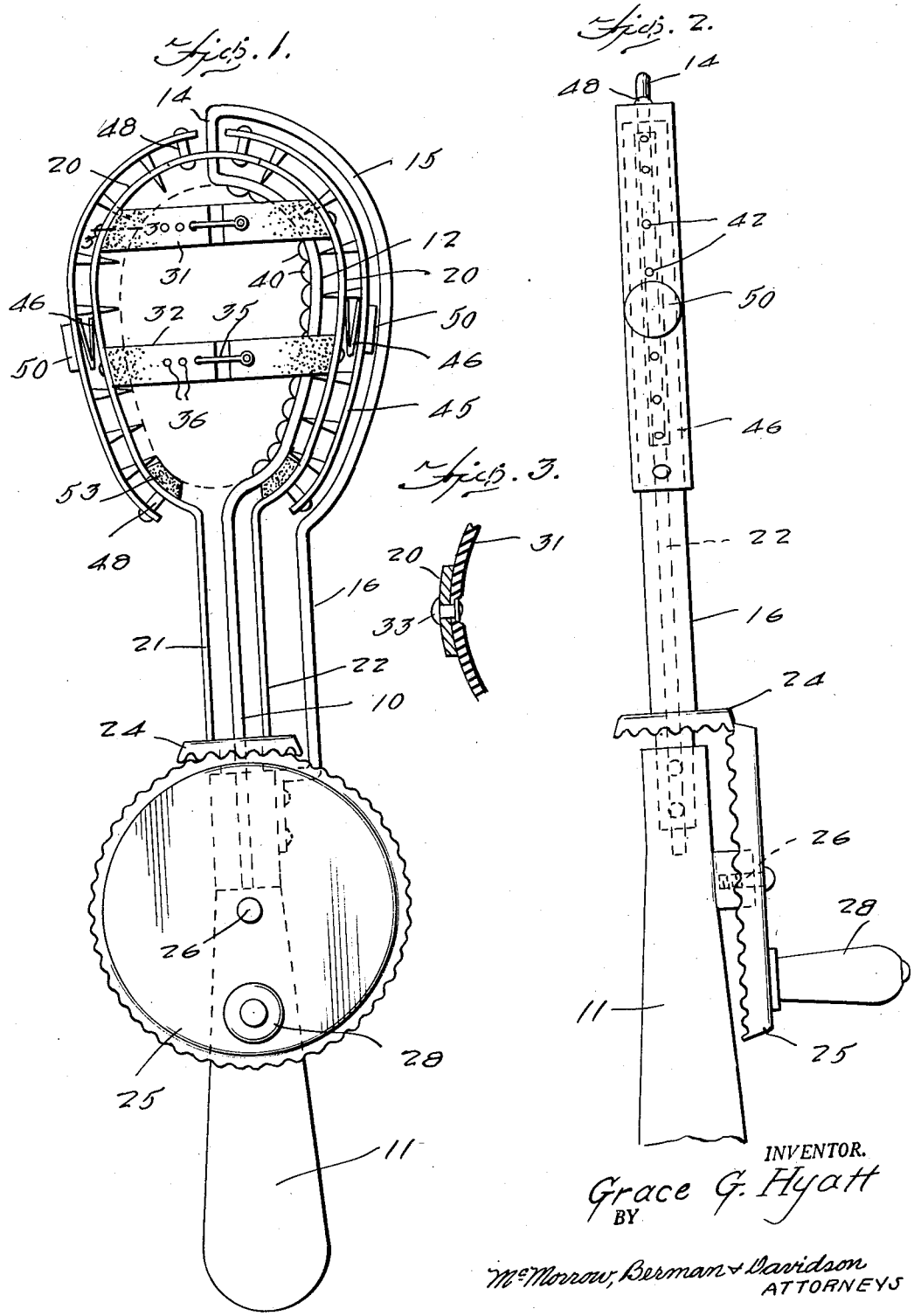
INVENTOR.
Grace G. Hyatt
BY
McMorrow, Berman & Davidson
ATTORNEYS Patented Feb. 28, 1950

2,498,811

UNITED STATES PATENT OFFICE 2,498,811

HARD BOILED EGG SHELLER

Grace G. Hyatt, Hemet, Calif.

Application July 25, 1947, Serial No. 763,706

5 Claims. (Cl. 146—2)

This invention relates to a device for peeling a boiled egg.

It is a principal object of the invention to provide a device that will hold a boiled egg, crack the shell, and then rotate it against a series of teeth to remove the cracked shell.

A preferred embodiment of the invention is illustrated in the accompanying drawings. It is understood, however, that modifications may be made therein without departing from the spirit of the invention as hereinafter claimed.

Figure 1 represents a front elevation of the new and improved egg peeler.

Figure 2 is a side elevation of the device.

Figure 3 is an enlarged horizontal section of a portion of the device, taken along the line 3—3 of Figure 1.

The device comprises a fixed vertical frame 10 mounted on a vertical standard 11. The frame 10 has an upper oval-shaped portion 12 and a further vertical extension 14 in line with the main portion of the frame 10. The vertical extension 14 is reversely curved to form a second oval-shaped portion 15, which is bent down vertically to constitute a fixed support 16 secured to the standard 11. The vertical extension 14 at the upper end of the device serves as a vertical pivot for an oval-shaped inner frame 20 that has two vertical shafts 21 and 22. The shafts 21 and 22 are rotatable by means of a horizontal gear 24 and a vertical gear 25, the latter being journaled on a horizontal pivot 26 and movable by means of a handle 28. Consequently, actuation of the handle 28 will turn the shafts 21 and 22 and the later will actuate the inner frame 20 in a path that will take it between the oval-shaped members 12 and 15.

Horizontally mounted about the movable inner frame 20 are two rubber bands 31 and 32. These rubber bands 31 and 32 are relatively wide, so as to exert considerable friction against an egg to be placed therein, as will be described more particularly hereinafter. The rubber bands 31 and 32 are fixed to the two arms of the inner frame 20 by means of rivets 33. The lower rubber band 32 has separable ends, and a hook 35 may be used to fasten one end to the other in any one of several openings 36 in accordance with the size of the egg contained therein. If desired, the upper rubber band 31 may be similarly separable, although a continuous rubber band will serve satisfactorily for most purposes.

The concave inner face of the fixed frame portion 12 is provided with a series of teeth 40, which are designed to remove the egg shell after it has been cracked.

The cracking of the egg shell is accomplished by a plurality of prongs 42 which are directed inwardly toward the egg. These prongs 42 are mounted on an outer frame 45, which is resiliently secured to the inner frame 20 by means of two or more coil springs 46. The inner frame 20 is suitably apertured to permit the prongs 42 to be movable therethrough to engage the egg. The ends of the outer frame 45 are secured to the inner frame 20 by means of a plurality of rivets 48. It will be obvious, therefore, that as the inner frame 20 is rotated, it will carry the outer frame 45 and the teeth 42 with it.

The outer frame 45 is provided with two finger holds 50 on the outside thereof, adjacent the springs 46.

In the operation of the device, an egg is positioned within the inner movable frame 20. For this purpose, the frame 20 may be provided with two rubber cushions 53 at the lower end thereof. After the egg has been positioned, it is locked in place by means of the fastener 35 on the lower rubber band 32. The finger holds 50 are then squeezed inwardly, that is, toward each other, and the outer frame 45 will be pushed against the egg so that the prongs 42 will crack the shell. The outer frame 45 may then be released, and the springs 46 will return it to its outward position.

The egg, of course, is rotated with the rubber bands 31 and 32 and the movable frames 20 and 45 against the fixed teeth 40.

After the shell has been removed, the rubber band 32 may be opened and the peeled egg removed.

I claim:

1. A device for removing the shell of a hard boiled egg, said device comprising a relatively stationary frame having a portion curved longitudinally to substantially conform to the curvature of a side of the egg, said curved portion having egg shell removing teeth distributed therealong, a rotary frame comprising opposed longitudinally curved elements corresponding in curvature to opposite sides of an egg, resilient means on and extending between said curved elements for yieldably holding a hard boiled egg between said curved elements, means for rotating said rotary frame to rotate the egg on its longitudinal axis with the shell of the egg in contact with said shell removing teeth, and means for fracturing the shell of the egg to facilitate the shell removing action of said teeth comprising egg shell puncturing means mounted on said rotary frame.

2. A device for removing the shell of a hard boiled egg, said device comprising a relatively stationary frame having a portion curved longitudinally to substantially conform to the curvature of a side of the egg, said curved portion having egg shell removing teeth distributed therealong, a rotary frame comprising opposed longitudinally curved elements corresponding in curvature to opposite sides of an egg, resilient means on and extending between said curved elements for yieldably holding a hard boiled egg between said curved elements, means for rotating said rotary frame to rotate the egg on its longitudinal axis with the shell of the egg in contact with said shell removing teeth, and means for fracturing the shell of the egg to facilitate the shell removing action of said teeth comprising egg shell puncturing means mounted on said rotary frame, said puncturing means comprising members flexibly mounted on said rotary frame curved elements having prongs directed toward the egg shell, said members being normally retracted and arranged to be compressed inwardly to engage said prongs piercingly with the shell of the egg.

3. A device for removing the shell from a hard boiled egg, said device comprising a stationary frame comprising a rod terminating at its outer end in a portion curved to fit the side of the egg, shell removing teeth distributed along said curved portion, a rotary frame comprising an elliptical loop whose opposite side portions conform in curvature to the opposite sides of the egg, means axially journalling said frame on said rod for axial rotation relative thereto, stretchable bands on said rotary frame loop for compressibly holding a hard boiled egg in place in said elliptical loop for rotation on the axis of said rod in engagement with said shell removing teeth, and means on said stationary frame for rotating said rotary frame relative to said stationary frame.

4. A device for removing the shell from a hard boiled egg, said device comprising a stationary frame comprising a rod terminating at its outer end in a portion curved to fit the side of the egg, shell removing teeth distributed along said curved portion, a rotary frame comprising an elliptical loop whose opposite side portions conform in curvature to the opposite sides of the egg, means axially journalling said frame on said rod for axial rotation relative thereto, stretchable bands on said rotary frame loop for compressibly holding a hard boiled egg in place in said elliptical loop for rotation on the axis of said rod in engagement with said shell removing teeth, and means on said stationary frame for rotating said rotary frame relative to said stationary frame, and means for fracturing said egg shell preparatory to rotating said rotary frame to rotate the egg against said shell removing teeth comprising outwardly spring pressed elements mounted on said opposite side portions of said rotary frame, said elements normally occupying outwardly retracted inoperative positions, and inwardly directed prongs on said elements arranged to pierce the egg shell as said elements are compressed inwardly.

5. A device for removing the shell from a hard boiled egg, said device comprising a stationary frame comprising a rod terminating at its outer end in a portion curved to fit the side of the egg, shell removing teeth distributed along said curved portion, a rotary frame comprising an elliptical loop whose opposite side portions conform in curvature to the opposite sides of the egg, means axially journalling said frame on said rod for axial rotation relative thereto, stretchable bands on said rotary frame loop for compressibly holding a hard boiled egg in place in said elliptical loop for rotation on the axis of said rod in engagement with said shell removing teeth, and means on said stationary frame for rotating said rotary frame relative to said stationary frame, and means for fracturing said egg shell preparatory to rotating said rotary frame to rotate the egg against said shell removing teeth comprising outwardly spring pressed elements mounted on said opposite side portions of said rotary frame, said elements normally occupying outwardly retracted inoperative positions, and inwardly directed prongs on said elements arranged to pierce the egg shell as said elements are compressed inwardly, said prongs being slidably engaged and guided by said loop side portions.

GRACE G. HYATT.

REFERENCES CITED

The following references are of record in the file of this patent:

UNITED STATES PATENTS

| Number | Name | Date |
|---|---|---|
| 1,399,901 | Sparer | Dec. 31, 1921 |
| 1,458,998 | Sletto | June 19, 1923 |
| 1,483,676 | Petersen | Feb. 12, 1924 |
| 1,648,979 | Bessette | Nov. 15, 1927 |
| 2,018,044 | Weiss | Oct. 22, 1935 |
| 2,172,419 | Thomas | Sept. 12, 1939 |